(12) United States Patent
Mahurin et al.

(10) Patent No.: US 10,474,461 B2
(45) Date of Patent: Nov. 12, 2019

(54) INSTRUCTION-BASED SYNCHRONIZATION OF OPERATIONS INCLUDING AT LEAST ONE SIMD SCATTER OPERATION

(71) Applicant: QUALCOMM Incorporated, San Diego, CA (US)

(72) Inventors: Eric Mahurin, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/272,613

(22) Filed: Sep. 22, 2016

(65) Prior Publication Data

US 2018/0081687 A1    Mar. 22, 2018

(51) Int. Cl.
G06F 9/30      (2018.01)
G06F 9/38      (2018.01)
G06F 12/0875   (2016.01)
G06F 15/80     (2006.01)

(52) U.S. Cl.
CPC ........ *G06F 9/30043* (2013.01); *G06F 9/3004* (2013.01); *G06F 9/3017* (2013.01); *G06F 9/30087* (2013.01); *G06F 9/382* (2013.01); *G06F 9/3834* (2013.01); *G06F 9/3855* (2013.01); *G06F 12/0875* (2013.01); *G06F 15/8007* (2013.01); *G06F 2212/452* (2013.01)

(58) Field of Classification Search
None
See application file for complete search history.

(56) References Cited

U.S. PATENT DOCUMENTS

| 6,112,282 | A | 8/2000 | Lynch |
| 6,681,317 | B1 * | 1/2004 | Mathews ............... G06F 9/383 712/203 |
| 8,418,155 | B2 | 4/2013 | McAllister et al. |
| 8,935,475 | B2 | 1/2015 | Asaro et al. |
| 2006/0026371 | A1 * | 2/2006 | Chrysos ............... G06F 9/3004 711/158 |
| 2009/0249026 | A1 | 10/2009 | Smelyanskiy et al. |
| 2010/0042771 | A1 * | 2/2010 | Kawaguchi ......... G06F 12/0808 711/5 |
| 2014/0040599 | A1 | 2/2014 | Fleischer et al. |
| 2014/0136811 | A1 | 5/2014 | Fleischer et al. |
| 2015/0095578 | A1 * | 4/2015 | Doshi ................ G06F 12/0888 711/125 |
| 2015/0317158 | A1 | 11/2015 | Ashcraft et al. |
| 2017/0116247 | A1 * | 4/2017 | Jonsson ..................... G06F 9/52 |

FOREIGN PATENT DOCUMENTS

EP    1569091 A2    8/2005

OTHER PUBLICATIONS

International Search Report and Written Opinion—PCT/US2017/044105—ISA/EPO—dated Oct. 17, 2017, 14 pages.

* cited by examiner

*Primary Examiner* — George Giroux
(74) *Attorney, Agent, or Firm* — Qualcomm Incorporated-Toler (57) ABSTRACT

A method of determining an execution order of memory operations performed by a processor includes executing at least one single-instruction, multiple-data (SIMD) scatter operation by the processor to store data to a memory. The method further includes executing one or more instructions by the processor to determine the execution order of a set of memory operations. The set of memory operations includes the at least one SIMD scatter operation.

26 Claims, 3 Drawing Sheets

INSTRUCTION-BASED SYNCHRONIZATION OF OPERATIONS INCLUDING AT LEAST ONE SIMD SCATTER OPERATION

I. FIELD

The present disclosure is generally related to electronic devices and more particularly to operation of processors included in electronic devices.

II. DESCRIPTION OF RELATED ART

An electronic device may include one or more processors that perform operations. A processor may have a single-instruction, multiple-data (SIMD) configuration that enables the processor to perform a particular operation based on multiple data portions (e.g., by performing an operation for each bit of a vector).

The processor may perform an SIMD store operation to store the multiple data portions to multiple regions of a memory. The multiple data portions may be stored to adjacent regions of the memory, or the multiple data portions may be randomly stored to the memory. For example, an SIMD scatter store operation may be performed to randomly store (or "scatter") the multiple data portions to non-adjacent portions of the memory that are associated with a set of addresses.

The processor may determine an order of operations to access the memory. For example, if another operation targets one or more of the addresses of the SIMD scatter store operation, the other operation may be delayed (or may "stall") until completion of the SIMD scatter store operation.

To enable ordering of SIMD scatter operations, a device may track addresses targeted by SIMD scatter store operations. For example, a device may include hardware that indicates addresses that are "in use" by SIMD scatter store operations, and a processor may access the hardware prior to initiating another operation. Tracking addresses in such a manner uses resources of the processor and may slow operation of the processor.

III. Summary

A processor in accordance with the disclosure may execute instructions (e.g., instead of tracking addresses using hardware) to synchronize (e.g., determine timing of) a set of operations that includes one or more single-instruction, multiple-data (SIMD) scatter store operations. For example, the instructions may include a scatter store-release instruction and a load-acquire instruction that form a "barrier" for memory operations. The scatter store-release instruction may prevent memory operations that precede the scatter store-release instruction from executing after the scatter store-release instruction, and the load-acquire instruction may prevent memory operations that follow the load-acquire instruction from executing before the load-acquire instruction. In an illustrative example, the scatter store-release instruction is an "empty" instruction that does not indicate data to be stored. In other implementations, execution of the scatter store-release instruction may cause the processor to store data (e.g., to a memory).

Use of instruction-based operation synchronization may improve processor performance. For example, use of a scatter store-release operation and a load-acquire operation may enable the processor to reduce or avoid tracking addresses using hardware (e.g., by enabling the processor to manage ordering of SIMD scatter store operations using the scatter store-release instruction and the load-acquire instruction instead of using special purpose hardware).

In an illustrative example, a method of determining an execution order of memory operations performed by a processor includes executing at least one SIMD scatter operation by the processor to store data to a memory. The method further includes executing one or more instructions by the processor to determine the execution order of a set of memory operations, such as by enabling a particular memory access operation to complete prior to initiating another memory access operation. The set of memory operations includes the at least one SIMD scatter operation.

In another illustrative example, an apparatus includes a scatter detector circuit configured to detect a SIMD scatter instruction. The apparatus also includes an execution unit configured to execute the SIMD scatter instruction to initiate an SIMD scatter operation, to execute a memory access instruction to initiate a memory access operation, and to execute a third instruction in response to detection of the SIMD scatter instruction to determine an execution order of the memory access operation and the SIMD scatter operation.

In another illustrative example, a non-transitory computer-readable medium stores instructions executable to perform operations by a processor. The operations include executing one or more instructions by the processor to determine an execution order of a set of memory operations that includes the at least one SIMD scatter operation.

In another illustrative example, an apparatus includes means for detecting a SIMD scatter instruction. The apparatus further includes means for executing the SIMD scatter instruction to initiate an SIMD scatter operation, to initiate a memory access operation, and to determine an execution order of the memory access operation and the SIMD scatter operation.

One particular advantage provided by at least one of the disclosed examples is reduced circuit area in a processor. For example, by using instructions to synchronize memory access operations, use of special purpose hardware to track addresses that are targeted by the memory access operations may be avoided. As a result, circuit area available for other hardware is increased. Other aspects, advantages, and features of the present disclosure will become apparent after review of the entire application, including the following sections: Brief Description of the Drawings, Detailed Description, and the Claims.

V. DETAILED DESCRIPTION

Figure 1:
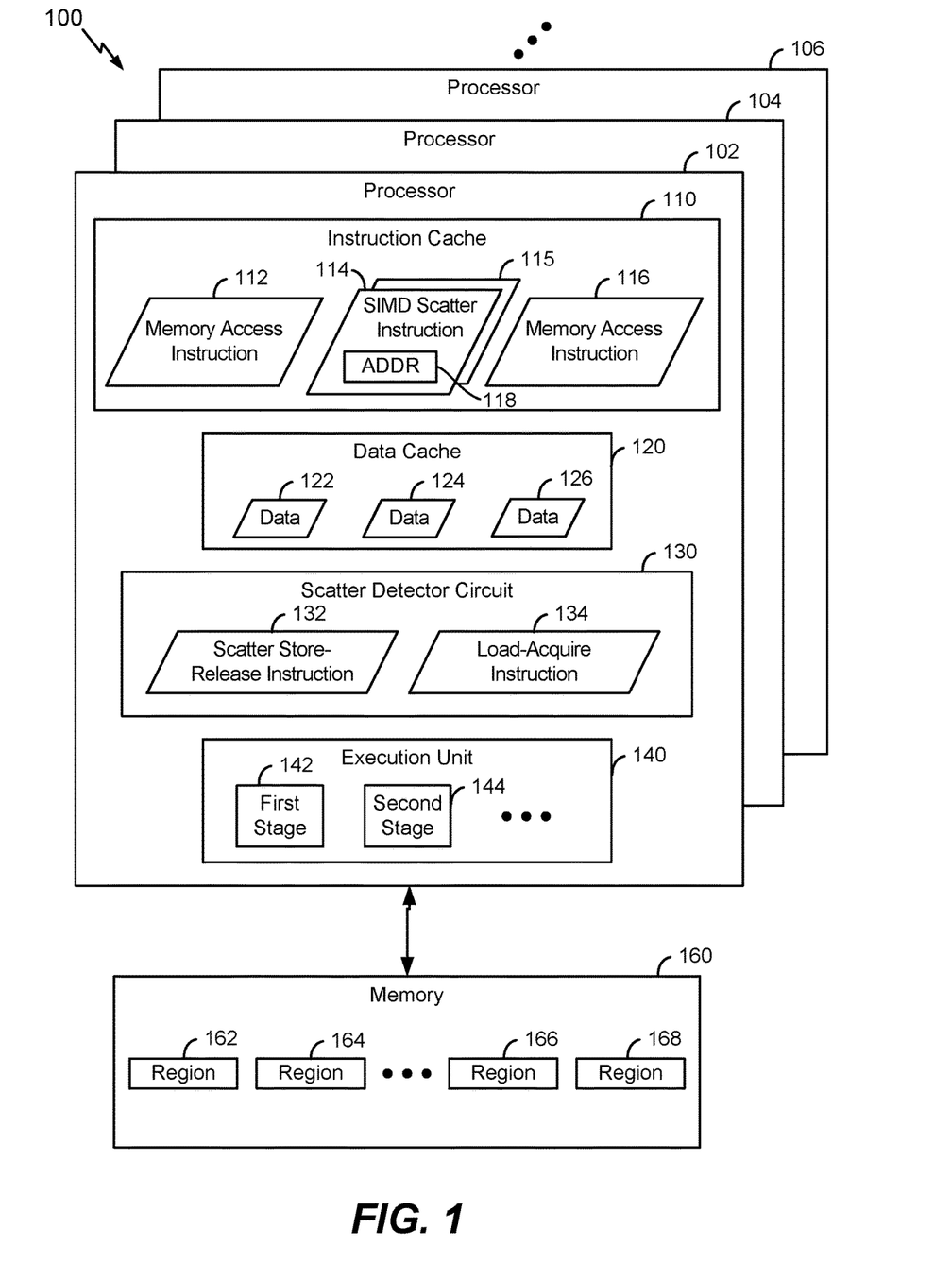
FIG. 1 is a block diagram of an illustrative example of a system that includes a processor configured to execute instructions to synchronize memory access operations.

Referring to FIG. 1, an illustrative example of a system is depicted and generally designated 100. The system 100 includes one or more processors, such as a processor 102, a processor 104, and a processor 106. Depending on the particular implementation, the processors 102, 104, and 106 may be included in a common integrated circuit (e.g., in a system-on-chip device) or in separate integrated circuits. Although the illustrative example of FIG. 1 depicts three processors, in other implementations the system 100 may include a different number of processors. The processors 102, 104, and 106 may be coupled to a memory 160.

In the example of FIG. 1, the processor 102 includes a storage device, such as an instruction cache 110. The instruction cache 110 may be configured to store instructions, such as a memory access instruction 112, a single-instruction, multiple data (SIMD) scatter instruction 114, and a memory access instruction 116. In an illustrative example, the memory access instruction 112 includes a store instruction, a load instruction, a SIMD scatter instruction, or a SIMD gather instruction. The memory access instruction 116 may include a store instruction, a load instruction, a SIMD scatter instruction, or a SIMD gather instruction.

The SIMD scatter instruction 114 may indicate an address 118 of the memory 160. Although FIG. 1 illustrates a single address 118, it is noted that the SIMD scatter instruction 114 targets multiple addresses (e.g., multiple independent addresses) of the memory 160. For example, the SIMD scatter instruction 114 may be executed by the processor 102 to store multiple components of a vector to the memory 160, where each component of the vector is stored to a different address of the memory 160. The addresses may be non-consecutive.

The processor 102 may also include a data cache 120. The data cache 120 may be configured to store data, such as data 122, 124, and 126.

The processor 102 may further include a scatter detector circuit 130. The scatter detector circuit 130 may be configured to access a release instruction (e.g., a scatter store-release instruction 132) and an acquire instruction (e.g., a load-acquire instruction 134). In some implementations, the scatter detector circuit 130 is coupled to the instruction cache 110 and is configured to detect SIMD scatter instructions (e.g., the SIMD scatter instruction 114) stored at the instruction cache 110. The processor 102 may be configured to execute one or more instructions (e.g., the instructions 132, 134) in response to detecting an SIMD scatter instruction (e.g., the SIMD scatter instruction 114), as described further below.

The processor 102 further includes one or more execution units, such as an execution unit 140. The execution unit 140 may include multiple stages, such as a first stage 142 and a second stage 144. For example, the stages 142, 144 may correspond to pipeline stages, and the execution unit 140 may have a pipelined configuration. The execution unit 140 may be coupled to the instruction cache 110, to the data cache 120, and to the scatter detector circuit 130.

The memory 160 includes a plurality of memory regions, such as regions 162, 164, 166, and 168. The address 118 may indicate one of the regions 162, 164, 166, and 168. The address 118 may be included in a set of one or more addresses targeted by an SIMD scatter operation. For example, the set of one or more addresses may correspond to regions of the memory 160 (e.g., any of the regions 162, 164, 166, and 168).

During operation, the system 100 may execute instructions using one or more of the processors 102, 104, and 106. For example, the execution unit 140 may execute instructions received from the instruction cache 110, from the memory 160, or both. To further illustrate, the execution unit 140 may retrieve the memory access instruction 112 from the instruction cache 110 or from the memory 160. The execution unit 140 may execute the memory access instruction 112 to initiate a memory access operation to the memory 160. The memory access operation may include writing the data 122 to the memory 160 or reading the data 122 from the memory 160, as illustrative examples. In an illustrative example, memory operations performed by the processor 102 are not tracked by hardware of the processor 102.

In an illustrative example, the execution unit 140 executes the SIMD scatter instruction 114 after executing the memory access instruction 112. Executing the SIMD scatter instruction 114 initiates an SIMD scatter operation at the system 100. For example, executing the SIMD scatter instruction 114 may cause the processor 102 to access the data 124 from the data cache 120 and to store the data 124 to the memory 160. To further illustrate, the data 124 may include a data vector, and storing the data 124 to the memory 160 may include storing elements of the data vector to independent addresses of the memory 160.

The processor 102 is configured to detect the SIMD scatter instruction 114. For example, the scatter detector circuit 130 may be configured to detect that the SIMD scatter instruction 114 is to be executed by the execution unit 140. As an illustrative example, the scatter detector circuit 130 may be configured to parse instructions stored at the instruction cache 110 to detect one or more instructions having a particular opcode corresponding to SIMD scatter instructions. In this example, the scatter detector circuit 130 may detect the SIMD scatter instruction 114 based on an opcode of the SIMD scatter instruction 114.

The execution unit 140 is configured to execute a third instruction in response to detection of the SIMD scatter instruction 114. For example, the processor 102 may be configured to execute the scatter store-release instruction 132 after executing the SIMD scatter instruction 114. In some implementations, the scatter detector circuit 130 is configured to provide the scatter store-release instruction 132 to the execution unit 140. The scatter store-release instruction 132 may indicate the address 118.

The execution unit 140 is configured to execute the scatter store-release instruction 132 to determine an execution order of a set of memory operations performed by the processor 102. For example, execution of the scatter store-release instruction 132 may cause the processor 102 to complete memory access operations that precede a scatter store-release operation identified by the scatter store-release instruction 132 prior to performing the scatter store-release operation. As an illustrative example, the processor 102 may "wait" to perform the scatter store-release operation until the completion of the memory access operation indicated by the memory access instruction 112, until completion of the SIMD scatter operation indicated by the SIMD scatter instruction 114, or both. By "waiting" until completion of the SIMD scatter operation, execution of the release instruction may defer updating of a particular architectural state of the memory 160 (e.g., by avoiding overwriting of data) until completion of the SIMD scatter operation.

As used herein, "synchronization" of memory access operations may include enabling a particular memory access operation to complete prior to initiating another memory access operation, such as by "waiting" for the particular memory access operation to complete, by delaying the other memory access operation, or both. As used herein, synchronization may be applied to multiple memory access operations (e.g., in connection with inter-operation synchronization), may be applied to sub-operations of a particular SIMD scatter operation (e.g., in connection with intra-operation synchronization), or both. As used herein, determining an execution order of memory operations may include enabling execution of the memory operations in a preexisting order (e.g., by executing the memory operations without changing an order of the memory operations).

In some implementations, the scatter store-release instruction 132 corresponds to a "fake" store instruction that is "empty" of data. In this example, execution of the scatter store-release instruction 132 does not cause the processor 102 to access the data cache 120 or the memory 160. Instead, the processor 102 may use the scatter store-release instruction 132 to synchronize memory operations. Further, the SIMD scatter instruction 114 may include a first opcode that indicates that the SIMD scatter instruction 114 is to be "empty" of data. In this case, another SIMD scatter instruction used to store data may include a second opcode that is different than the first opcode (to indicate that the other SIMD scatter instruction is used to store data).

In some implementations, the processor 102 is configured to synchronize one or more memory access operations that target a common address as the SIMD scatter instruction 114. For example, the processor 102 may synchronize memory access operations indicated by the instructions 112, 114 in response to detecting that the instructions 112, 114 each indicate the address 118. In this illustrative implementation, the processor 102 may refrain from synchronizing the memory access operations indicated by the instructions 112, 114 if the instructions 112, 114 indicate different addresses.

In other implementations, the processor 102 is configured to synchronize memory access operations irrespective of addresses targeted by the memory access operations. To illustrate, in some implementations, the address 118 may be determined by the processor 102 relatively "late" in the execution unit 140 (e.g., at a pipeline stage that follows the stages 142, 144). In this example, comparing addresses of certain instructions (e.g., the instructions 114, 116) to determine whether the instructions target a common address may be infeasible. To further illustrate, the memory access operation indicated by the memory access instruction 116 may target a different address than the address 118, and the execution unit 140 may be configured to synchronize the memory access operation and the SIMD scatter operation indicated by the SIMD scatter instruction 114 (e.g., using the scatter store-release instruction 132).

In other implementations, the processor 102 is configured to synchronize a set of SIMD scatter operations without synchronizing one or more other memory access operations, such as load operations or store operations, as illustrative examples. To illustrate, in some implementations, the processor 102 may synchronize the SIMD scatter operation indicated by the SIMD scatter instruction 114 with one or more other SIMD scatter operations and may refrain from synchronizing one or more other memory access operations. For example, the memory access operation indicated by the memory access instruction 112 may be a second SIMD scatter operation, and the execution unit 140 may be configured to synchronize the second SIMD scatter operation and the SIMD scatter operation indicated by the SIMD scatter instruction 114 (e.g., using the scatter store-release instruction 132) without synchronizing one or more other memory access operations.

The processor 102 may be configured to execute another instruction (e.g., a fourth instruction) in response to detecting the SIMD scatter instruction 114. For example, the processor 102 may be configured to execute the load-acquire instruction 134 (or another load instruction) in response to detecting the SIMD scatter instruction 114. In some implementations, the scatter detector circuit 130 provides the load-acquire instruction 134 to the execution unit 140. The load-acquire instruction 134 may indicate (e.g., may target) the address 118. The scatter store-release instruction 132 and the load-acquire instruction 134 may form a barrier (or a "fence") to synchronize memory access operations, as explained further below.

The load-acquire instruction 134 may be associated with a load-acquire operation that is delayed (e.g., that stalls) until a scatter store-release operation associated with the scatter store-release instruction 132 is complete. Further, because the scatter store-release operation may not be completed (e.g., may wait) until completion of one or more prior SIMD scatter operations, the load-acquire instruction 134 may be delayed (e.g., may stall) until completion of the one or more prior SIMD scatter operations.

To further illustrate, a release instruction (e.g., the scatter store-release instruction 132) and an acquire instruction (e.g., the load-acquire instruction 134) may form a barrier that synchronizes memory access operations. For example, the scatter store-release instruction 132 may prevent memory access operations that precede the scatter store-release instruction 132 from executing after the scatter store-release instruction 132, and the load-acquire instruction 134 may prevent memory access operations that follow the load-acquire instruction 134 from executing before the load-acquire instruction 134. To further illustrate, the scatter store-release instruction 132 may prevent a memory access operation indicated by the memory access instruction 112 from executing after the scatter store-release instruction 132, and the load-acquire instruction 134 may prevent a memory access operation indicated by the memory access instruction 116 from executing before the load-acquire instruction 134 (e.g., execution of the load-acquire instruction 134 may stall until completion of execution of the scatter store-release instruction 132).

In some implementations, a set of SIMD scatter operations initiated by the processor 102 may be performed in a pipelined manner (e.g., using a software pipelining technique). To illustrate, if the memory access instruction 116 indicates a second SIMD scatter operation, the processor 102 may pipeline the SIMD scatter operations associated with the instructions 114, 116. In some cases, the processor 102 is configured to pipeline the SIMD scatter operations in response to determining that the instructions 114, 116 do not indicate a common address.

In addition, in some implementations, the processor 102 may group (or "bundle") multiple SIMD scatter operations to be executed in a pipelined manner. For example, if the memory access instruction 116 indicates a second SIMD scatter operation, the processor 102 may execute the instructions 114, 116 in parallel (e.g., using multiple processing cores or multiple execution units of the processor 102). In an illustrative example, the processor 102 executes the instructions 132, 134 in response to determining that a number of a plurality of SIMD scatter operations satisfies a threshold, as described further with reference to FIG. 3. Thus, although FIG. 1 has been described with reference to a single SIMD scatter operation, it should be appreciated that in some implementations the processor 102 may group (or "bundle") multiple SIMD scatter operations. The multiple SIMD scatter operations may be associated with a single scatter store-release instruction, a single load-acquire instruction, or both.

To further illustrate, in some implementations, the processor 102 is configured to execute a plurality of SIMD scatter instructions, such as the SIMD scatter instruction 114 and a second SIMD scatter instruction 115. The processor 102 may be configured to aggregate the plurality of SIMD scatter instructions and execute the plurality of SIMD scatter instructions in parallel, such as using multiple processing cores of the processor 102. The processor 102 may be configured to aggregate a number of SIMD scatter instructions that satisfies (e.g., that is greater than or that is greater than or equal to) a threshold. The processor 102 may execute the instructions 132, 134 in response to determining that the number of the plurality of SIMD scatter operations satisfies the threshold (e.g., is greater than the threshold or is greater than or equal to the threshold).

One or more aspects described with reference to FIG. 1 may improve processor performance. For example, detecting a scatter instruction using the scatter detector circuit 130 and using the instructions 132, 134 to form a barrier (or a "fence") to synchronize the instructions 112, 114, and 116 may avoid use of hardware that tracks memory access operations, such as a hardware that indicates addresses that are in use by SIMD scatter operations. Further, the scatter detector circuit 130 may have reduced circuit size and complexity as compared to hardware that tracks memory access operations. As a result, special purpose hardware that checks addresses to determine whether an address is in use may be reduced or avoided.

Figure 2:
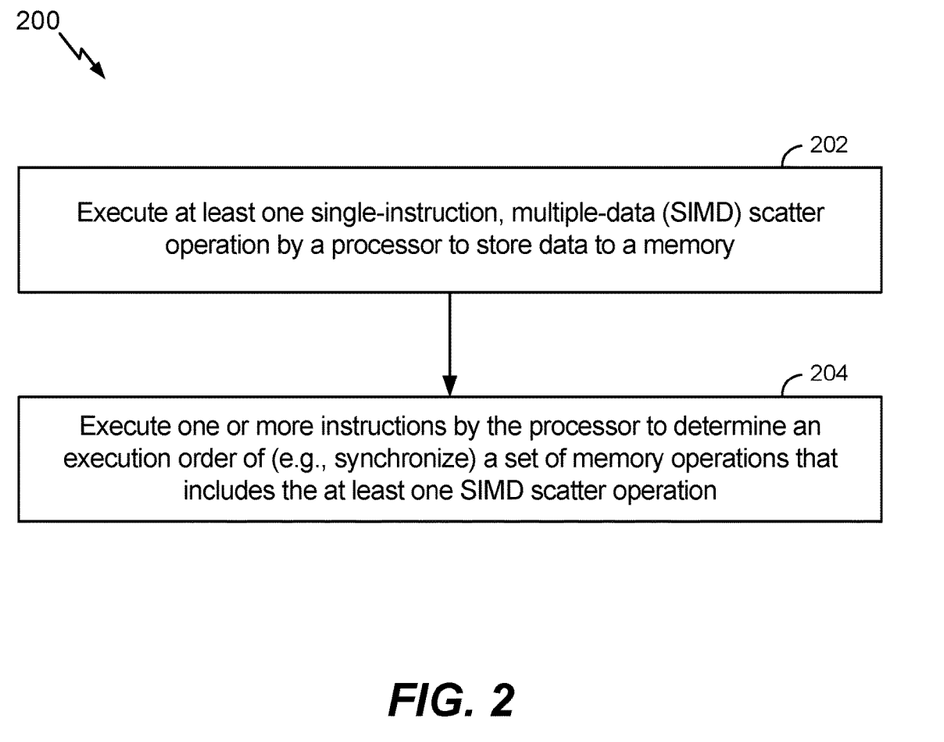
FIG. 2 is a diagram of an illustrative example of a method of determining an execution order of memory operations of a processor, such as the processor of FIG. 1.

Referring to FIG. 2, a particular illustrative example of a method of determining an execution order of memory operations performed by a processor is depicted and generally designated 200. The method 200 may be performed by one or more of the processors 102, 104, and 106 of FIG. 1, as illustrative examples.

The method 200 includes executing at least one single-instruction, multiple-data (SIMD) scatter operation by a processor to store data to a memory, at 202. For example, the processor 102 may initiate a SIMD scatter operation by executing the SIMD scatter instruction 114 to store the data 124 to the memory 160.

The method 200 further includes executing one or more instructions by the processor to determine an execution order of a set of memory operations that includes the at least one SIMD scatter operation, at 204. For example, the one or more instructions may include the instructions 132, 134, and the set of memory operations may include memory operations indicated by the instructions 112, 114, and 116. In an illustrative example of the execution order, one or both of the memory operations indicated by the instructions 112, 116 are performed before the at least one SIMD scatter operation. In another illustrative example of the execution order, the at least one SIMD scatter operation is performed before one or both of the memory operations indicated by the instructions 112, 116.

Executing the one or more instructions may include executing a release instruction (e.g., the scatter store-release instruction 132) in response to initiating the at least one SIMD scatter operation. In an illustrative example, the release instruction does not indicate data (e.g., the release instruction may be "empty" of data). The release instruction may indicate at least a first address of a region of the memory targeted by the at least one SIMD scatter operation, such as the address 118.

The method 200 may optionally include receiving, during the SIMD scatter operation, an instruction to perform a load operation associated with the first address, and prior to completing the SIMD scatter operation, delaying performing the load operation. For example, the memory access instruction 116 may indicate a load operation to load data from the memory 160. In response to receiving the memory access instruction 116 by the execution unit 140 prior to completion of the SIMD scatter operation, the processor 102 may delay the load operation. The method 200 may optionally include performing the load operation in response to detecting completing of the SIMD scatter operation.

Executing the one or more instructions may include executing an acquire instruction (e.g., the load-acquire instruction 134) in response to initiating the at least one SIMD scatter operation. In an illustrative example, executing the one or more instructions includes executing a release instruction (e.g., the scatter store-release instruction 132) and an acquire instruction (e.g., the load-acquire instruction 134) in response to initiating the at least one SIMD scatter operation. Depending on the particular implementation, executing the one or more instructions may include executing one (but not both) of the release instruction and the acquire instruction.

In some examples, the at least one SIMD scatter operation includes a plurality of SIMD scatter operations. For example, as described with reference to FIG. 1, the processor 102 may group multiple SIMD scatter operations to be executed in a pipelined manner by the execution unit 140. In an illustrative example, the processor 102 executes the one or more instructions in response to determining that a number of the plurality of SIMD scatter operations satisfies a threshold, as described further with reference to FIG. 3.

The method 200 of FIG. 2 may be used to synchronize multiple memory access operations (e.g., in connection with an inter-operation synchronization), to synchronize sub-operations of a particular SIMD scatter operation (e.g., in connection with an intra-operation synchronization), or both. To illustrate, in an example of inter-operation synchronization, synchronizing the set of operations may include determining an order of the at least one SIMD scatter operation and another memory access operation indicated by another memory access instruction, such as the memory access instruction 112 or the memory access instruction 116. In an example of intra-operation synchronization, synchronizing the set of operations includes determining an order of sub-operations of the at least one SIMD scatter operation (e.g., by synchronizing vector operations associated with the at least one SIMD scatter operation).

Figure 3:
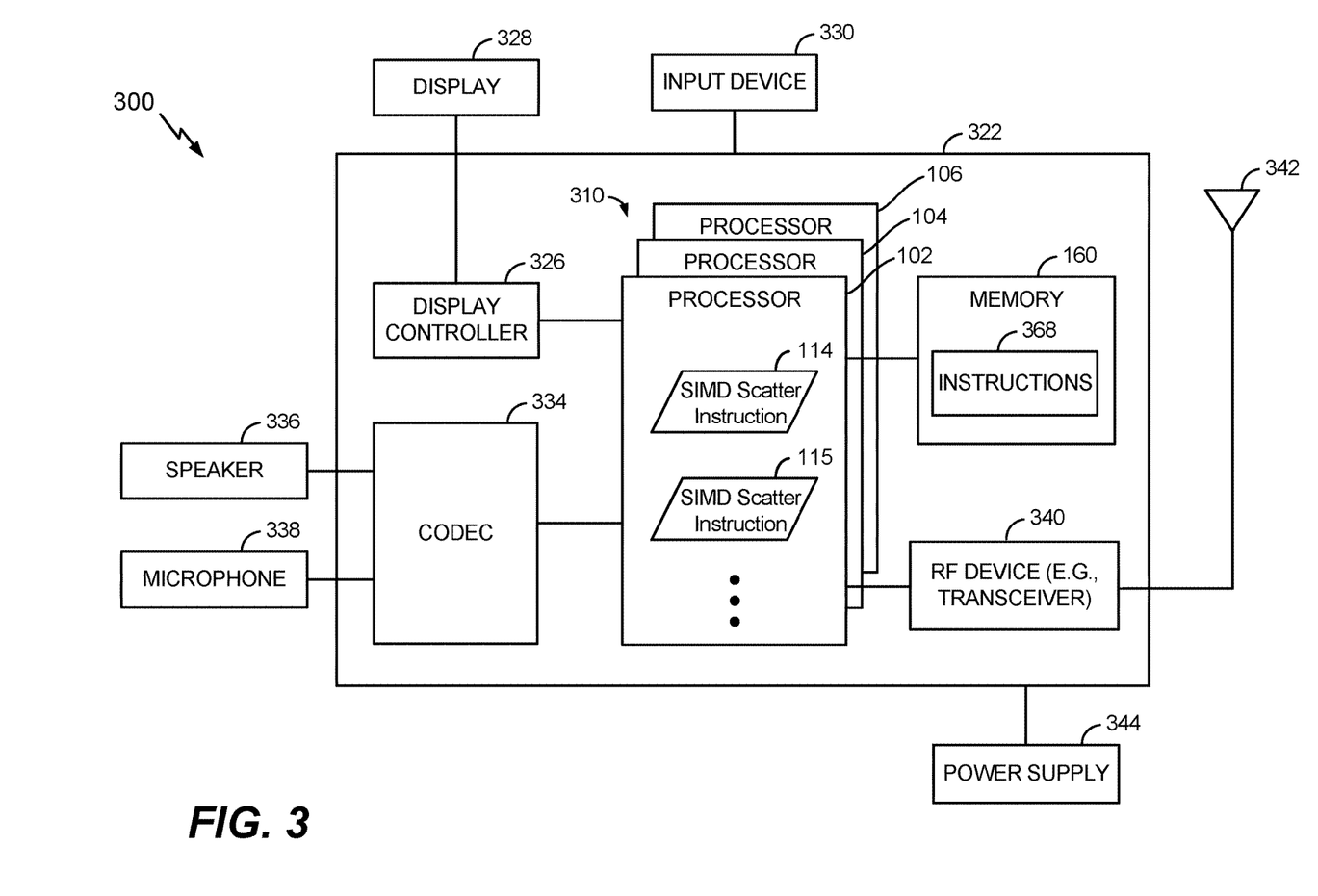
FIG. 3 is a block diagram of an illustrative example of an electronic device that includes a processor, such as the processor of FIG. 1, that is configured to execute instructions to synchronize memory access operations.

Referring to FIG. 3, a block diagram of a particular illustrative example of an electronic device is depicted and generally designated 300. The electronic device 300 may correspond to a mobile device (e.g., a cellular phone), a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 300 includes one or more processors, such as a multiprocessor device 310. The multiprocessor device 310 may include the processors 102, 104, and 106. The multiprocessor device 310 may include a digital signal processor (DSP), a central processing unit (CPU), a graphics processing unit (GPU), another processing device, or a combination thereof.

The electronic device 300 may further include one or more memories, such as the memory 160. The memory 160 may be coupled to the multiprocessor device 310. The memory 160 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 160 may store instructions 368. The instructions 368 are executable by the multiprocessor device 310 to perform one or more operations, such as operations of the method 200 of FIG. 2. The instructions 368 may include one or more of the instructions 112, 114, 116, 132, and 134 of FIG. 1.

A coder/decoder (CODEC) 334 can also be coupled to the multiprocessor device 310. The CODEC 334 may be coupled to one or more microphones, such as a microphone 338. FIG. 3 also shows a display controller 326 that is coupled to the multiprocessor device 310 and to a display 328. A speaker 336 may be coupled to the CODEC 334. FIG. 3 also indicates that an antenna 342 may be coupled to a radio frequency (RF) device 340 (e.g., a transceiver).

In a particular example, the multiprocessor device 310, the memory 160, the display controller 326, the CODEC 334, and the RF device 340 are included in or attached to a system-on-chip (SoC) device 322. Further, an input device 330 and a power supply 344 may be coupled to the SoC device 322. Moreover, in a particular example, as illustrated in FIG. 3, the display 328, the input device 330, the speaker 336, the microphone 338, the antenna 342, and the power supply 344 are external to the SoC device 322. However, each of the display 328, the input device 330, the speaker 336, the microphone 338, the antenna 342, and the power supply 344 can be coupled to a component of the SoC device 322, such as to an interface or to a controller.

In connection with the described examples, a computer-readable medium (e.g., the memory 160) the stores instructions (e.g., the instructions 368) executable by a processor (e.g., the processor 102) to perform operations. The operations include executing one or more instructions (e.g., the instructions 132, 134) by the processor to determine an execution order of a set of memory operations that includes at least one SIMD scatter operation. The set of memory operations may correspond to any of the instructions 112, 114, 115, and 116, as an illustrative example.

In connection with the described examples, an apparatus includes means (e.g., the scatter detector circuit 130) for detecting a SIMD scatter instruction (e.g., the SIMD scatter instruction 114). The apparatus further includes means (e.g., the execution unit 140) for executing the SIMD scatter instruction to initiate an SIMD scatter operation, to initiate a memory access operation, and to determine an execution order of the memory access operation and the SIMD scatter operation.

In connection with the described examples, a process includes performing a series of scatters (e.g., scatter operations corresponding to one or more of the SIMD scatter instructions 114, 115) to a first region of a memory (e.g., to any of the region 162 of the memory 160). The process further includes performing a data-less scatter store-release operation (e.g., using the scatter store-release instruction 132) to a start of the first region. The process also includes performing a series of scatters to a next region of the memory (e.g., to the region 164). The process also includes sequentially loading and processing information from the first region using a load operation (e.g., using the load-acquire instruction 134). The load operation stalls until completion of the scatter store-release operation.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The chips are then employed in electronic devices, such as the electronic device 300 of FIG. 3.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 200 of FIG. 2 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A method of determining an execution order of memory operations performed by a processor, the method comprising:
   in response to detecting a single-instruction, multiple-data (SIMD) scatter instruction, scheduling execution of a store-release instruction after the SIMD scatter instruction, wherein the store-release instruction is configured to synchronize access to a memory;
   executing the SIMD scatter instruction by the processor to initiate a scatter operation; and
   executing the store-release instruction by the processor, wherein the scatter operation is performed prior to completion of the execution of the store-release instruction.

2. The method of claim 1, wherein the scatter operation is executed without tracking an execution status of the scatter operation.

3. The method of claim 1, wherein execution of the scatter operation by the processor includes storing elements of a data vector to independent addresses of the memory.

4. The method of claim 1, wherein the store-release instruction is configured to be executed in response to initiating the scatter operation.

5. The method of claim 1, wherein executing the store-release instruction defers updating of a particular architectural state of the memory until completion of the store-release instruction, wherein the store-release instruction completes when memory operations initiated prior to the store-release instruction are completed.

6. The method of claim 4, wherein the store-release instruction corresponds to a barrier instruction, and wherein the store-release instruction does not include a data operand.

7. The method of claim 4, wherein the store-release instruction indicates at least a first address of a region of the memory targeted by the scatter operation.

8. The method of claim 7, wherein the first address is included in a set of one or more addresses targeted by the scatter operation.

9. The method of claim 4, further comprising scheduling execution of an acquire instruction, wherein the store-release instruction and the acquire instruction form a barrier associated with the scatter operation.

10. The method of claim 1, further comprising executing an acquire instruction after execution of the store-release instruction, wherein the execution of the acquire instruction stalls until completion of execution of the store-release instruction.

11. An apparatus comprising:
   a scatter detector unit configured to issue a store-release instruction in response to detecting a single-instruction, multiple-data (SIMD) scatter instruction; and
   an execution unit configured to receive the store-release instruction from the scatter detector unit, the execution unit configured to execute the SIMD scatter instruction to initiate a scatter operation, to execute a memory access instruction to initiate a memory access operation, and to execute the store-release instruction, wherein the scatter operation is configured to be performed prior to completion of the store-release instruction.

12. The apparatus of claim 11, further comprising a data cache that is coupled to the execution unit and that is configured to store data.

13. The apparatus of claim 12, wherein the execution unit is configured to access the data and to store the data to a memory in response to executing the SIMD scatter instruction.

14. The apparatus of claim 11, wherein the execution unit does not access data in response to executing the store-release instruction.

15. The apparatus of claim 11, wherein the memory access instruction and the SIMD scatter instruction indicate a common address.

16. The apparatus of claim 15, wherein the execution unit is further configured to determine an execution order of the memory access operation and the scatter operation in response to detecting that the memory access instruction and the SIMD scatter instruction indicate the common address.

17. The apparatus of claim 11, wherein the memory access instruction and the SIMD scatter instruction indicate different addresses.

18. The apparatus of claim 11, wherein the memory access operation corresponds to a second scatter operation following the scatter operation, and wherein the execution unit is configured to stall the second scatter operation until completion of the scatter operation.

19. The apparatus of claim 11, wherein the store-release instruction is configured to be scheduled for execution after the SIMD scatter instruction, and wherein the scatter operation is configured to be performed prior to completion of the store-release instruction.

20. The apparatus of claim 11, wherein the scatter detector unit is further configured to provide a load-acquire instruction to the execution unit in response to detecting the SIMD scatter instruction, wherein the load-acquire instruction is configured to be scheduled for execution prior to the memory access instruction, and wherein execution of the memory access instruction stalls until completion of the load-acquire instruction.

21. The apparatus of claim 11, further comprising an instruction cache configured to store the SIMD scatter instruction and the memory access instruction.

22. A non-transitory computer-readable medium storing instructions executable to perform operations by a processor, the operations comprising:
   in response to detecting a single-instruction, multiple-data (SIMD) scatter instruction, scheduling execution of a store-release instruction after the SIMD instruction, the store-release instruction configured to synchronize access to a memory;
   executing the SIMD scatter instruction by the processor to initiate a scatter operation; and
   executing the store-release instruction by the processor, wherein the scatter operation is configured to be performed prior to completion of the store-release instruction.

23. The non-transitory computer-readable medium of claim 22, wherein executing the store-release instruction enables a particular memory access operation to complete prior to initiating another memory access operation.

24. An apparatus comprising:
   means for issuing a scatter store-release instruction in response to detecting a single-instruction, multiple-data (SIMD) scatter instruction; and
   means for receiving the scatter store-release instruction from the means for issuing and for executing the SIMD scatter instruction to initiate a scatter operation and executing the scatter store-release instruction, wherein the scatter operation is configured to be performed prior to completion of the scatter store-release instruction.

25. The apparatus of claim 24, wherein the scatter store-release instruction is configured to be scheduled after the SIMD scatter instruction.

26. The apparatus of claim 24, wherein the means for receiving and executing is configured to execute a load-acquire instruction.

* * * * *